US012683835B1

(12) United States Patent
Rani et al.

(10) Patent No.: US 12,683,835 B1
(45) Date of Patent: Jul. 14, 2026

(54) FLOATING TAP PARTIALLY ROLLED DIGITAL FEEDBACK EQUALIZATION ARCHITECTURE

(71) Applicant: Cadence Design Systems, Inc., San Jose, CA (US)

(72) Inventors: Shikha Rani, Bangalore (IN); Hari Anand Ravi, Bangalore (IN); Hajee Mohammed Shuaeb Fazeel, Bengaluru (IN); Sachin Ramesh Gugwad, San Jose, CA (US)

(73) Assignee: Cadence Design Systems, Inc., San Jose, CA (US)

( * ) Notice: Subject to any disclaimer, the term of this patent is extended or adjusted under 35 U.S.C. 154(b) by 136 days.

(21) Appl. No.: 18/621,469

(22) Filed: Mar. 29, 2024

(51) Int. Cl.
 *H04L 25/03* (2006.01)

(52) U.S. Cl.
 CPC .. *H04L 25/03057* (2013.01); *H04L 25/03885* (2013.01); *H04L 2025/0349* (2013.01); *H04L 2025/03579* (2013.01)

(58) Field of Classification Search
 CPC .................... H04L 25/03057; H04L 25/03885
 USPC ........................................................ 375/233
 See application file for complete search history.

(56) References Cited

U.S. PATENT DOCUMENTS

| | | | | | |
|---|---|---|---|---|---|
| 7,952,376 | B1 * | 5/2011 | Yu Kasnavi | ..... | G01R 31/31715 |
| | | | | | 324/750.01 |
| 9,722,820 | B1 * | 8/2017 | Hekmat | ............ | H04L 25/03146 |
| 11,483,185 | B1 * | 10/2022 | Gugwad | ........... | H04L 25/03146 |
| 2013/0039407 | A1 * | 2/2013 | Aziz | ................. | H04L 25/03057 |
| | | | | | 375/233 |
| 2019/0173695 | A1 * | 6/2019 | Qian | ................. | H04L 25/03057 |

* cited by examiner

*Primary Examiner* — Leila Malek
(74) *Attorney, Agent, or Firm* — Mark H. Whittenberger; Holland & Knight LLP

(57) ABSTRACT

The present disclosure relates to a floating tap, partially rolled digital feedback equalization circuit and method of using the same. The circuit may include an analog front end circuit and a digital circuit in electrical communication with the analog front end circuit, wherein the analog front end circuit includes a first unrolled tap and a plurality of rolled taps.

18 Claims, 17 Drawing Sheets

400

100

300

| Signal Name | Signal Type | Description |
|---|---|---|
| PAD | Input Pin | Data Signal |
| VREF_L | Input Pin | Reference Signal with Tap1 subtracted |
| VREF_H | Input Pin | Reference Signal with Tap1 added |
| VREF_LL | Internal Signal | Reference Signal with Tap1 and Tap2 subtracted |
| VREF_LH | Internal Signal | Reference Signal with Tap1 added and Tap2 subtracted |
| VREF_HL | Internal Signal | Reference Signal with Tap1 subtracted and Tap2 added |
| VREF_HH | Internal Signal | Reference Signal with Tap1 and Tap2 added |
| TAP2_LL<6:0>, TAP2_LH<6:0>, TAP2_HL<6:0>, TAP2_HH<6:0> | Input Pin | CAPDAC codes to implement Tap2 |
| TAP3<6:0> | Input Pin | CAPDAC codes to implement Tap3 |
| TAP4<6:0> | Input Pin | CAPDAC codes to implement Tap4 |
| C_LL,C_LH,C_HL,C_HH | Internal Signal | Comparator outputs corresponding to 4 different VREF values: VREF_LL, VREF_LH, VREF_HL, VREF_HH |
| FB<1:0> | Internal Signal | 3UI and 4UI delayed bits as feedback to CAPDACs |
| C_E,C_O | Output Pin | Even and Odd sampled data sent to FIFO |

| Signal Name | Signal Type | Description |
|---|---|---|
| PAD | Input Pin | Data Signal |
| VREF_L | Input Pin | Reference Signal with Tap1 subtracted |
| VREF_H | Input Pin | Reference Signal with Tap1 added |
| VREF_LE | Internal Signal | Reference Signal with Tap1 subtracted and rolled taps added/subtracted based on FB_E<2:0> |
| VREF_LO | Internal Signal | Reference Signal with Tap1 subtracted and rolled taps added/subtracted based on FB_O<2:0> |
| VREF_HE | Internal Signal | Reference Signal with Tap1 added and rolled taps added/subtracted based on FB_E<2:0> |
| VREF_HO | Internal Signal | Reference Signal with Tap1 added and rolled taps added/subtracted based on FB_E<2:0> |
| TAP2<6:0> | Input Pin | CAPDAC codes to implement Tap2 |
| FLOATING_TAP1<6:0> | Input Pin | CAPDAC codes to implement Floating Tap1 (can be Tap3/4/5) |
| FLOATING_TAP2<6:0> | Input Pin | CAPDAC codes to implement Floating Tap2 (can be Tap4/5/6) |
| FLOATING_TAPSEL1<1:0> | Input Pin | Control Signal to select floating_TAP1 out of 3rd, 4th and 5th Tap |
| FLOATING_TAPSEL2<1:0> | Input Pin | Control Signal to select Floating_TAP2 out of 4th, 5th and 6th Tap |
| C_L,E,C_L,O,C_H,E,C_H,O | Internal Signalss | Comparator outputs corresponding to 4 different VREF values: VREF_LE, VREF_LO, VREF_HE, VREF_HO |
| FB_E<2:0>, FB_O<2:0> | Internal Signal | Previous bits as feedback to CAPDACs sampled using rising edge of DQS and DQSN as shown in Fig 4 |
| C_E,C_O | Output Pin | Even and Odd sampled data sent to FIFO |

| FLOATING_TAPSEL1<1:0> | FLOATING_TAP1 configured as |
|---|---|
| 0 | TAP3 |
| 1 | TAP4 |
| 2 | TAP5 |
| 3 | Invalid |

| FLOATING_TAPSEL2<1:0> | FLOATING_TAP2 configured as |
|---|---|
| 0 | TAP4 |
| 1 | TAP5 |
| 2 | TAP6 |
| 3 | Invalid |

1100 providing an analog front end circuit

1702 electrical connecting the analog front end circuit with a digital circuit, wherein the analog front end circuit includes a first unrolled tap and a plurality of rolled taps

1704

1700

FLOATING TAP PARTIALLY ROLLED DIGITAL FEEDBACK EQUALIZATION ARCHITECTURE

FIELD OF THE INVENTION

The present disclosure relates to data transmission and, more particularly, to a floating tap, partially rolled, digital feedback equalization architecture.

DISCUSSION OF THE RELATED ART

Serial data links (or TX/RX links) convey data over various media, such as a cable, a board trace, or backplane. Such a medium is often referred to as a channel. A channel can be imperfect and cause impairments on signals transmitted over the channel, such as attenuation, reflection, and noise (e.g., crosstalk). These impairments may lead to transmission errors. The quality of a channel can determine an upper limit on its achievable rate. Additionally, other impairments in a serial data link can degrade overall system performance. For instance, circuit non-idealities can also cause a degradation in a system's performance. Overall, minimizing impairments can enable a channel to reach or achieve higher link rates.

Double Data Rate 5 Synchronous Dynamic Random-Access Memory (DDR5 SDRAM) is a type of synchronous dynamic random-access memory. Compared to its predecessor DDR4 SDRAM, DDR5 was planned to reduce power consumption, while increasing bandwidth. A feature referred to as Decision Feedback Equalization (DFE) enables input/output (I/O) speed scalability for higher bandwidth and performance improvement.

SUMMARY

In one or more embodiments of the present disclosure, a floating tap, partially rolled digital feedback equalization circuit is provided. The circuit may include an analog front end circuit and a digital circuit in electrical communication with the analog front end circuit, wherein the analog front end circuit includes a first unrolled tap and a plurality of rolled taps.

One or more of the following features may be included. The analog front end circuit may include a plurality of fixed taps. The analog front end circuit may include a plurality of floating taps. The plurality of rolled taps may include 3 rolled taps. The circuit may further include an interleaved structure configured to allow data sampling using a rising and a falling edge of a sampling clock. Data that may be sampled using the rising edge may be EVEN data. Data that may be sampled using the falling edge may be ODD data. The analog front end circuit may include four comparators. One or more preamble bits may be used to generate a digital feedback equalization offset for one or more initial data bits. One or more postamble bits may be used to generate a digital feedback equalization offset for one or more initial data bits.

In another embodiment of the present disclosure, a floating tap partially rolled digital feedback equalization method is provided. The method may include providing an analog front end circuit and electrically connecting the analog front end circuit with a digital circuit, wherein the analog front end circuit includes a plurality of unrolled taps and a plurality of rolled taps.

One or more of the following features may be included. The analog front end circuit may include a plurality of fixed taps. The analog front end circuit may include a plurality of floating taps. The plurality of rolled taps may include 3 rolled taps. The method may further include data sampling, via an interleaved structure, a rising and a falling edge of a sampling clock. Data that may be sampled using the rising edge may be EVEN data. Data that may be sampled using the falling edge may be ODD data. The analog front end circuit may include four comparators. One or more preamble bits may be used to generate a digital feedback equalization offset for one or more initial data bits. One or more postamble bits may be used to generate a digital feedback equalization offset for one or more initial data bits.

Additional features and advantages of embodiments of the present disclosure will be set forth in the description which follows, and in part will be apparent from the description, or may be learned by practice of embodiments of the present disclosure. The objectives and other advantages of the embodiments of the present disclosure may be realized and attained by the structure particularly pointed out in the written description and claims hereof as well as the appended drawings.

It is to be understood that both the foregoing general description and the following detailed description are exemplary and explanatory and are intended to provide further explanation of embodiments of the invention as claimed.

BRIEF DESCRIPTION OF THE DRAWINGS

The accompanying drawings, which are included to provide a further understanding of embodiments of the invention and are incorporated in and constitute a part of this specification, illustrate embodiments of the invention and together with the description serve to explain the principles of embodiments of the invention.

FIG. 3 shows an example signal description table consistent with embodiments of the present disclosure;

FIG. 5 shows an example signal description table consistent with embodiments of the present disclosure;

FIG. 8 shows floating tap programmability tables consistent with the embodiments of the present disclosure;

DETAILED DESCRIPTION

For various applications such as data servers, artificial intelligence, and high performance computing, the DDR5 protocol is often utilized. At higher data rates, DFE has become a necessity to mitigate channel loss and reflections for adequate eye opening. Since DDR5 supports multi-channel, multi-rank applications, any reflected energy because of imperfect terminations tends to stay in channel for a larger number of bit intervals. So, the need arises to use multiple DFE taps at higher data rates. For reflective channels, post cursor inter-symbol interference (ISI) may be higher at higher order taps than lower order taps depending on the location of stub in the channel. This calls for a technique to have flexibility in having taps of higher order instead of lower order taps, which is referred to herein as a floating tap.

As used herein, the term "tap" may refer to the number of the prior bits whose effect are mitigated on the current bit". The phrase "rolled DFE" may refer to a DFE implemented by a dynamic offset controlled by direct feedback from previous bits. The phrase "unrolled DFE" may refer to a DFE implemented by having multiple parallel sub receivers which have different static offsets. A selection of outputs from the multiple sub receivers may be done after sampling the data. The phrase "floating tap" may refer to the tap which is being selected for DFE can be configured on silicon. The term "preamble" may refer to a set of symbols or bits used to indicate the start of a data burst. The term "postamble" may refer to a set of symbols or bits used to indicate the end of a data burst". The phrase "interleaved DFE structure" may refer to an arrangement where the rising and falling edge of data generated by two separate receivers which are then sampled.

Figure 1:
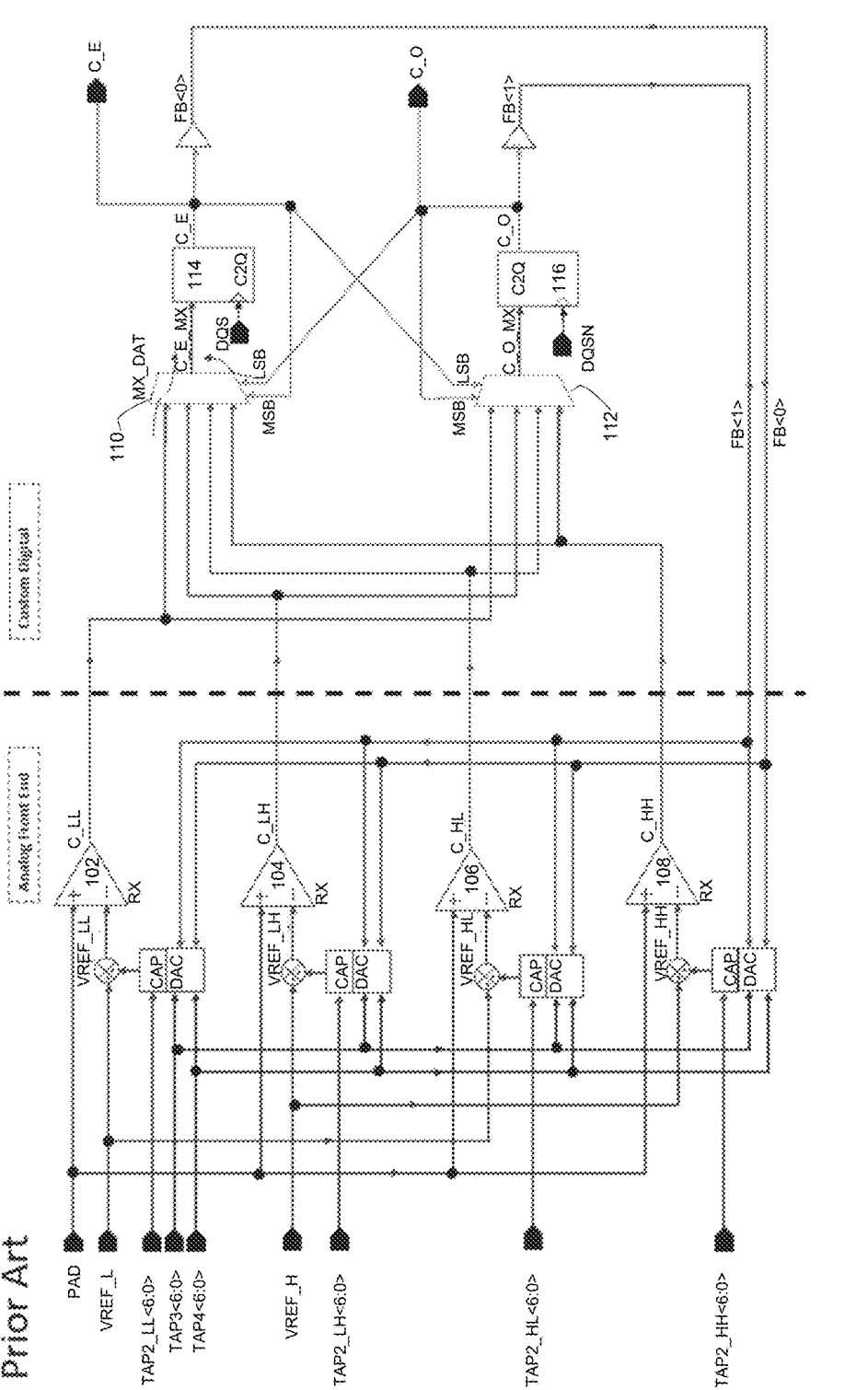
FIG. 1 shows an example decision feedback equalization circuit consistent with embodiments of the present disclosure.

Referring now to FIG. 1, a DFE may be implemented using a loop unrolling technique, where the receiver delay may be excluded from the timing closure path. However, the number of comparators used to implement an N-tap unrolled DFE is $2^N$, which increases the area and power exponentially. Accordingly, to strike a balance between PPA and the ease of timing closure, typically, the first two taps may be unrolled (e.g., 4 comparators needed), and the higher order taps may be rolled (e.g., no additional comparators). In DDR systems, implementation of DFE taps may be achieved using circuitry that is immune to temperature drift, and that scales linearly with supply voltage. This is because DFE taps in DDR systems are trained only at init, and not updated in the background to track system VT drift. As such, DFE taps (voltage offsets) may be implemented using resistor or capacitor DACs, instead of the traditional current-DACs used in SerDes applications.

More specifically, FIG. 1 depicts a 4-tap DFE receiver 100. Receiver 100 includes 2 tap unrolled DFE receivers 102, 104 and 2 tap rolled DFE receivers 106, 108. In this particular example, C_LL, C_LH, C_HL and C_HH are the four outputs corresponding to two unrolled taps. Each RX may be an amplifier that generates the difference between PAD and its VREF input and amplifies this difference. The voltage offset for first tap may be provided through two paths. One is through VREF_L and VREF_H. The other path is through TAP2_LL<6:0>, TAP2_LH<6:0>, TAP2_HL<6: 0> and TAP2 HH<6:0>. These TAP2* bits may also be used to provide offset for tap2. The DFE offset for tap3 and tap4 may be provided by TAP3<6:0> and TAP4<6:0>. The voltage offset using CAP_DAC may be provided by using a capacitive DAC which introduces an offset in a receiver where input is capacitively coupled.

In some embodiments, for unrolled taps, the offset by CAP_DAC may be static. For rolled taps, the offset introduced by CAP_DAC may be dynamic and changes polarity based on the previous bits corresponding to tap3 and tap4.

The selection of data output from tap unrolled DFE receivers 102, 104 and 2 tap rolled DFE receivers 106, 108, (i.e. C_LL, C_LH, C_HL and C_HH) may be achieved using multiplexers 110, 112. Multiplexers 110, 112 receive the previous even bit C_E and odd bit C_O as its selection lines. The outputs of multiplexers 110, 112, C_E MX and C_O_MX are then fed to samplers 114, 116 which sample the data.

Figures 2A, 2B:
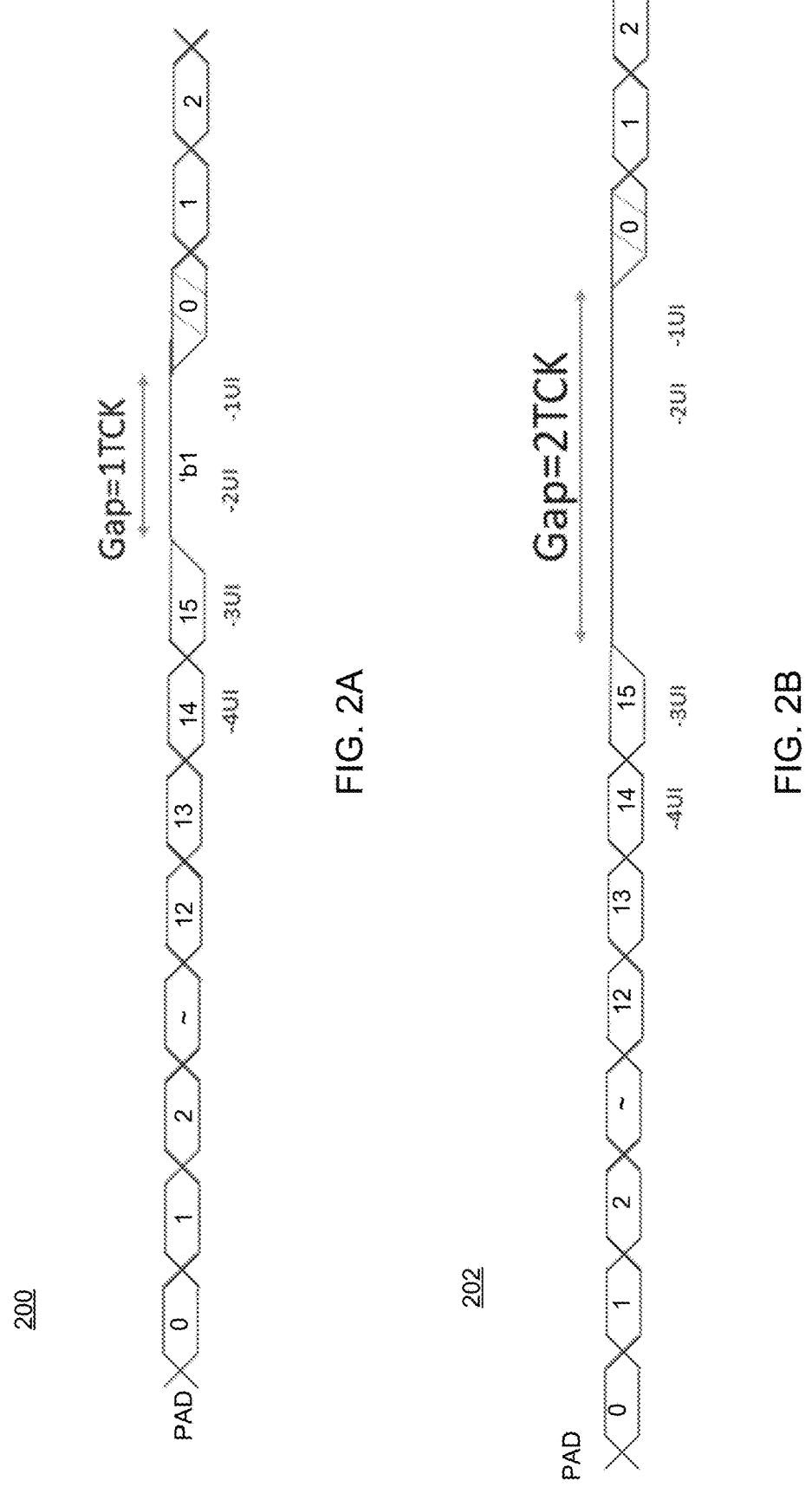
FIG. 2A shows an example diagram depicting a 2 unit interval gap between bursts consistent with the embodiments of the present disclosure.
FIG. 2B shows an example diagram depicting a 4 unit interval gap between bursts consistent with the embodiments of the present disclosure.

Existing DDR5 DFE architectures suffer from a number of limitations. For example, in DDR systems, the sampling clock (DQS) may be bursty in nature, with the gap between bursts being M*TCK (where M=0, 1, 2, 3, . . . and TCK=2UI). Also, if there are K bits, the DDR system sends only K clock edges to sample the data. In the known four-tap DFE architectures, the first bit of the burst assumes that the previous four bits are 1. However, this is not always true. It depends on the gap width between bursts as shown in FIG. 2A and FIG. 2B. Accordingly, third and fourth Tap DFE coefficients end up being sub-optimal because 3UI and 4UI delayed bit information available is not always correct.

FIG. 2A shows the case where the gap between two bursts is 2UI. DFE applied for the first bit of the burst (i.e., bit 0) is based on the previous four bits, which are (1,1, bit 15 of the previous burst, bit 14 of the previous bit). In the known four Tap DFE schemes, DFE applied for the first bit of the burst assumes the previous four bits are all 1, which is incorrect.

FIG. 2B shows the case where the gap between two bursts is 4UI. DFE applied for the first bit of the burst (i.e., bit 0) is based on the previous four bits, which are (1,1,1,1). This case works well for the known four Tap DFE scheme. However, if we have to extend this case to two floating taps, where the third tap is based on either 3UI or 4UI or 5UI delayed bit and the fourth tap is based on 4UI or 5UI or 6UI delayed bit, the known solution fails to provide the correct equalization value for the first and second bit of the burst. The gap between READ bursts changes over time, and so, if it is necessary to use the known DFE solution, any equalization applied for the first two bits in the bursts may not always be correct. An accompanying signal description is provided in the table of FIG. 3.

In addition to the limitations mentioned above, the known DFE approaches are difficult to close timing across PVT at high data rates, as there is a minimum and maximum timing constraint (for the rolled taps, feedback cannot be too fast or too slow). Due to the minimum timing constraint, it is not easily scalable to lower data rates (additional delay to be added in the feedback path to satisfy minimum timing constraint).

In contrast to the existing approaches, embodiments of the present disclosure may work well for any value of gap between Read bursts and may use pre-amble and post-amble edges to sample the previous bits before the valid bits arrive. In the existing approaches, pre-amble and post-amble edges are gated using a Read gate signal. However, using the present disclosure they are not gated and they may be used to sample previous bits to apply correct DFE coefficient for the incoming bursts. Accordingly, embodiments of the present disclosure work well for floating-tap DFE as well where the third tap is based on either 3UI or 4UI or 5UI delayed bit, and the fourth tap is based on 4UI or 5UI or 6UI delayed bit. The unwanted data (e.g., logic 1 that is present between bursts) may be discarded when reading from the FIFO, as explained in further detail hereinbelow. Embodiments included herein also have no minimum timing constraint, thereby making it easy to scale across data rates.

Figure 4:
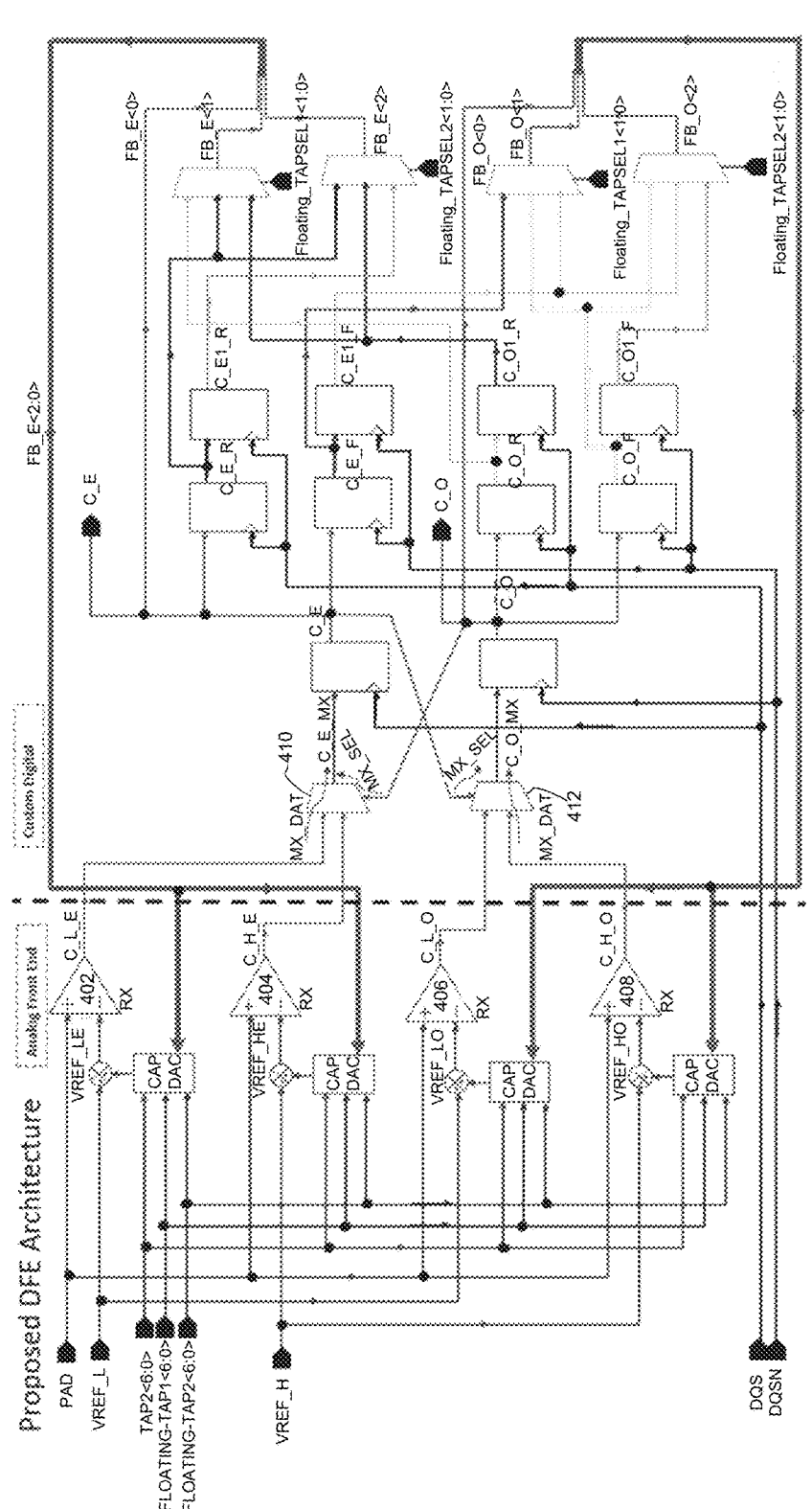
FIG. 4 shows an example decision feedback equalization circuit consistent with embodiments of the present disclosure.

Referring now to FIG. 4, an example circuit 400 consistent with embodiments of the present disclosure is provided. Circuit 400 includes a floating tap (e.g., up to 6 Taps) DFE receiver where the first tap is unrolled while the remaining three taps are rolled. An accompanying signal description table is provided in FIG. 5. In the particular example of FIG. 4, Tap1 and Tap2 may be fixed while floating Tap1 may be selected between Tap3, Tap4 and Tap5 and floating Tap2 may be selected between Tap4, Tap5 and Tap6.

More specifically, FIG. 4 is a 4-tap DFE receiver 400. Receiver 400 may include 1 unrolled tap and 3 rolled tap DFE receivers. The first tap may be unrolled and the last 3 taps are rolled. In this particular example, C_L_E and C_H_E are even receivers 402, 404 that sample even data and C_L_O and C_H_O are odd receivers 406, 408 that sample Odd data. C_L_E and C_H_E are two sub receivers 402, 404 corresponding to 1 unrolled tap. Similarly, C_L_O and C_H_0 are two sub receivers 406, 408 corresponding to two unrolled taps. Each RX may correspond to an amplifier that generates the difference between PAD and its VREF input and amplifies this difference. The voltage offset for the first tap may be provided through VREF_L and VREF_H. The TAP2<6:0>bits are used to provide offset for tap2. The DFE offset for tap3 and tap4 may be provided by FLOATING_TAP1<6:0> and FLOATING_TAP2<6:0>. These floating taps may also be configured to provided DFE offset corresponding to higher taps 5 and 6.

In some embodiments, the voltage offset using CAP_DAC may be provided by using a capacitive DAC which introduces offset in a receiver where input is capacitively coupled. For rolled taps, the offset introduced by CAP_DAC is dynamic and changes polarity based on the previous bits.

In some embodiments, the selection of data output from C_L_E and C_H_E 402, 404 may be achieved using multiplexer 410. Multiplexer 410 gets the previous odd bit as its selection line. The selection of data output from C_L_O and C_H_O 406, 408 may be achieved by using a second multiplexer 412. Second multiplexer 412 may receive the previous even bit as its selection line. The outputs of multiplexer 410 C_E_MUX and C_O_MUX may then be fed to samplers which sample the data.

In some embodiments, circuit 400 may utilize an interleaved structure where data may be sampled using both falling and rising edge of the sampling clock (DQS) separately, there is no minimum constraint on rolled tap loop timing which makes it scalable across different data rates. Data sampled using the rising edge of the sampling clock may be referred to as EVEN data (*_E) and data sampled using rising edge of DQSN (which is complementary to the sampling clock) may be referred to ODD data (*_O).

Figure 6:
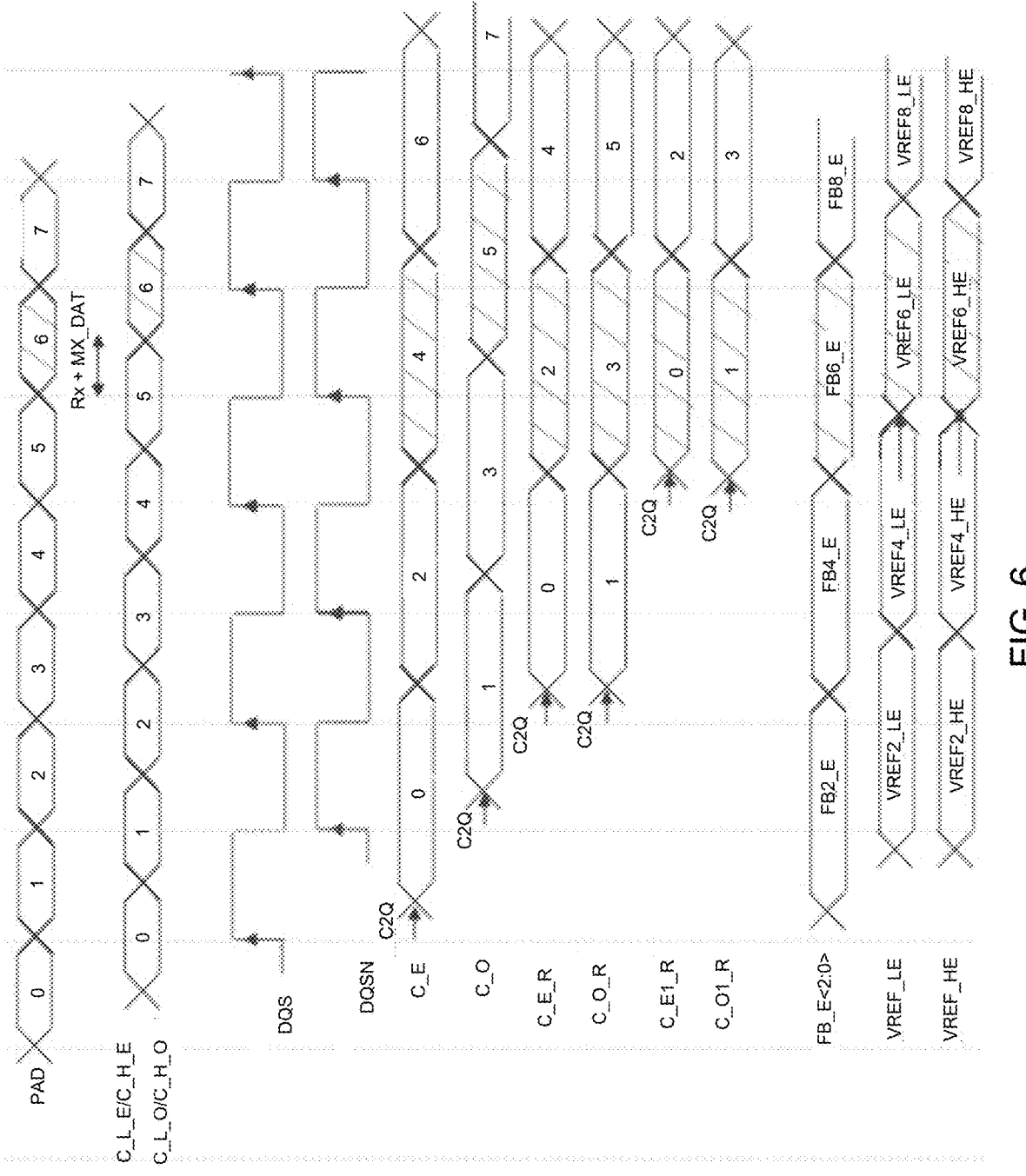
FIGS. 6-7 show example timing diagrams consistent with embodiments of the present disclosure.
Figure 7:
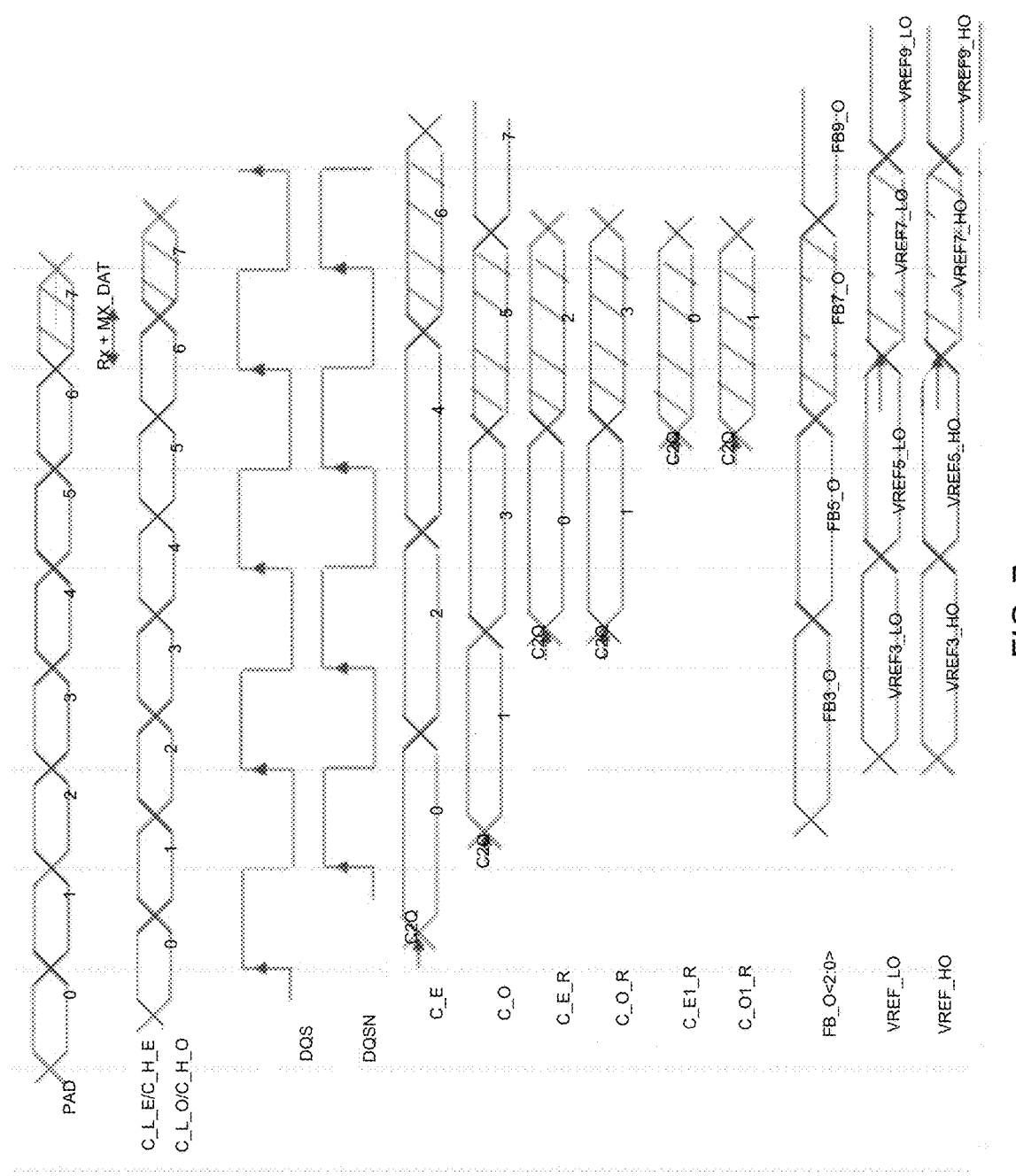

In some embodiments, 4 comparators may be used to implement this DFE architecture which provide the following outputs:

(i) C_L_E-Even feedback receiver output corresponding to VREF_L (ii) C_H_E-Even feedback receiver output corresponding to VREF_H (iii) C_L_O-Odd feedback receiver output corresponding to VREF_L (iv) C_H_O-Odd feedback receiver output corresponding to VREF_H FIGS. 6-7 show the timing diagrams for EVEN and ODD bit samples correspondingly.

FIG. 8 shows two tables depicting examples of floating tap programmability. For EVEN data bits, C_O & C_E acts as 1UI and 2UI delayed bits respectively. C_O_R, C_E_R, C_O1_R, C_E1_R act as 3UI, 4UI, 5UI and 6UI delayed bits respectively. For ODD data bits, C_E & C_O acts as 1UI and 2UI delayed bits respectively. C_E_F, C_O_F, C_E1_F, C_O1_F act as 3UI, 4UI, 5UI and 6UI delayed bits respectively. Floating_TAPSEL1<1:0>bits may be used to select Floating_TAP1 out of the third, fourth and fifth Tap and Floating_TAPSEL2<1:0>bits may be used to select Floating_TAP2 out of the fourth, fifth and sixth Tap. FB_E<2:0> and FB_O<2:0> are feedback bits based on EVEN and ODD samples which may be provided as inputs to the CAPDAC present at the input of receiver amplifier.

Figure 9:
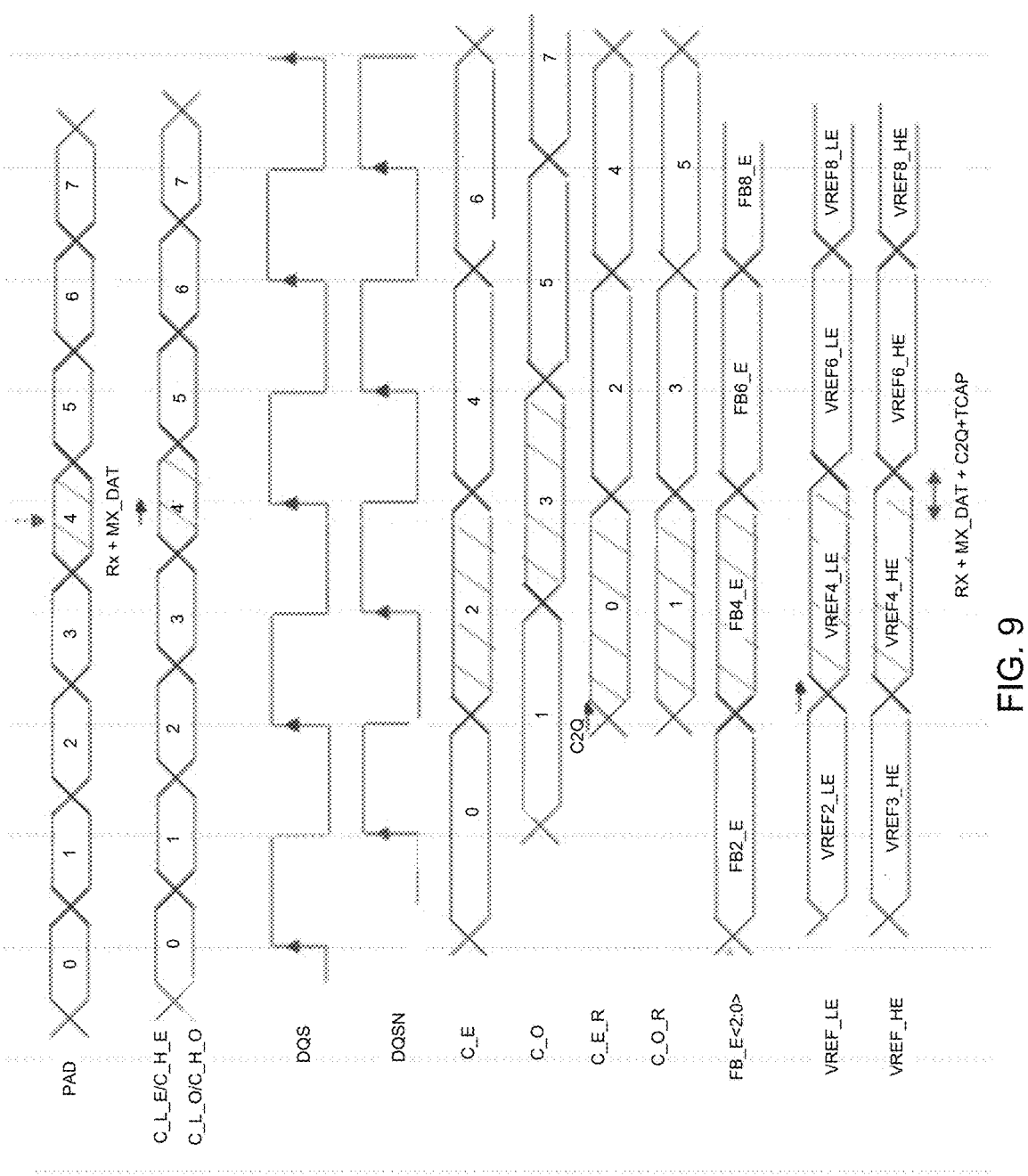
FIG. 9 shows an example timing diagrams consistent with embodiments of the present disclosure.

In some embodiments, the timing constraint to be met for Tap1 (unrolled) for this architecture may be C2Q+MX_SEL+SETUP<1UI. The timing constraint to be met for Tap2, Floating_Tap1 and Floating_Tap2 may be C2Q+TD+TCAP+SETUP<2UI−(RX+MX_DAT). FIG. 9 shows the sampling of EVEN data bits at lower data rates where delays are smaller as compared to UI. VREF for the concerned bit remains stable for at least for a time of (RX+MX_DAT+C2Q_TCAP). Accordingly, this architecture is scalable across data rates.

Figure 10:
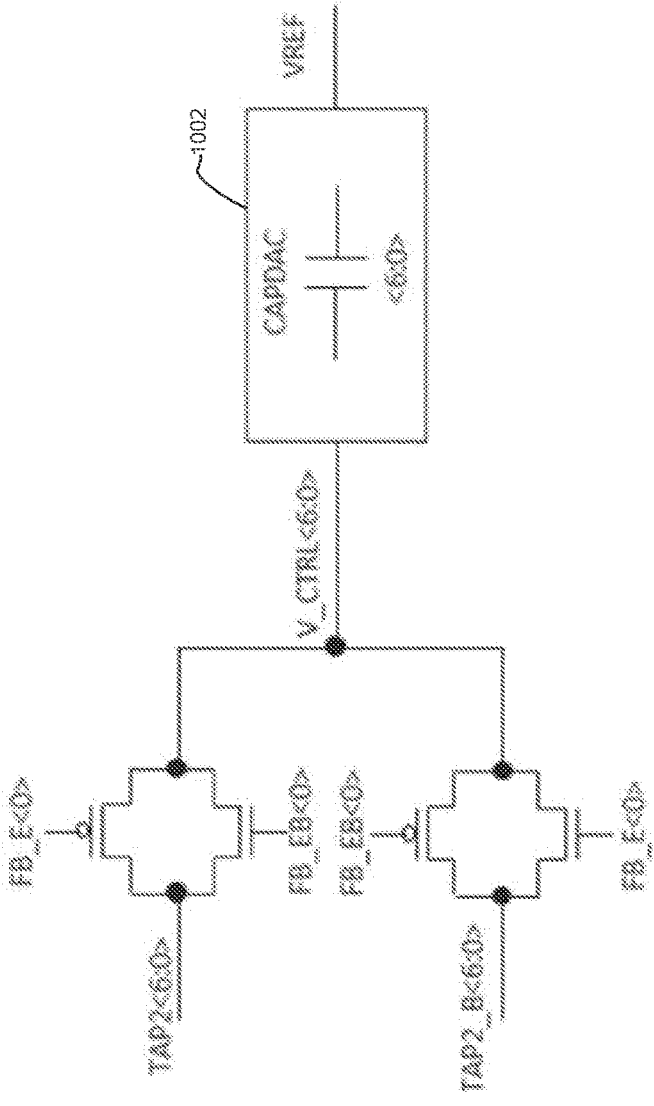
FIG. 10 shows an example CAPDAC implementation consistent with embodiments of the present disclosure.
Figure 11:
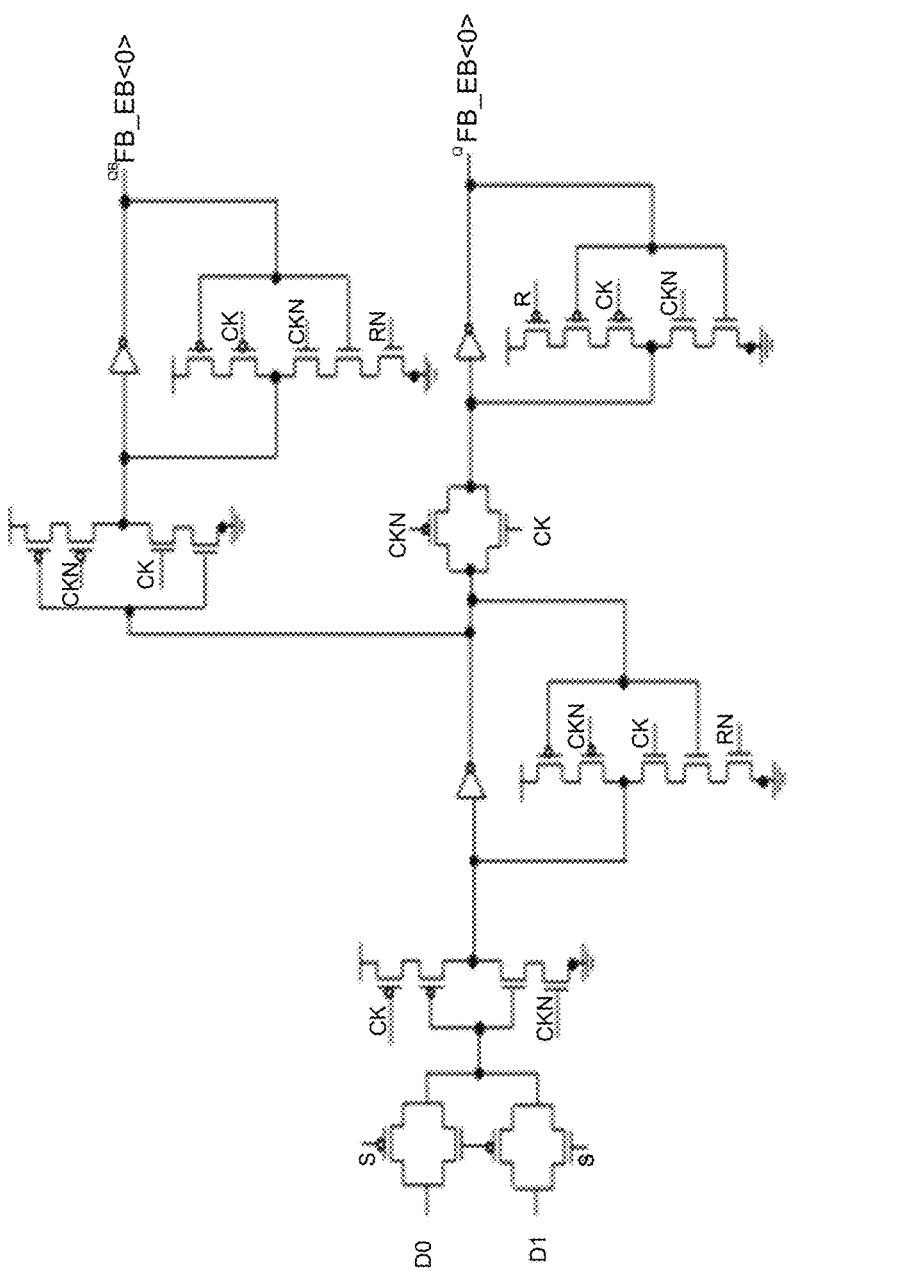
FIG. 11 shows an example circuit consistent with embodiments of the present disclosure.
Figure 12:
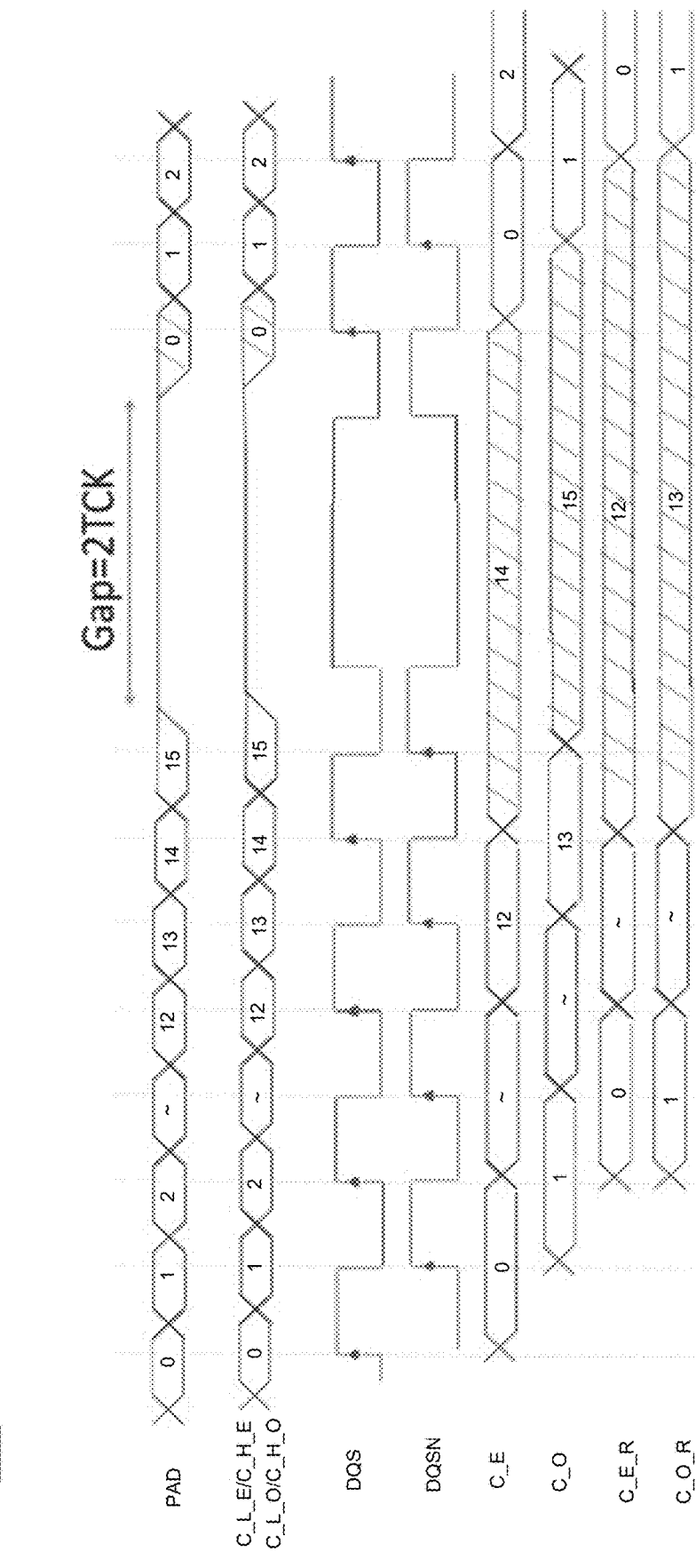
FIGS. 12-16 show example timing diagrams consistent with embodiments of the present disclosure.
Figure 13:
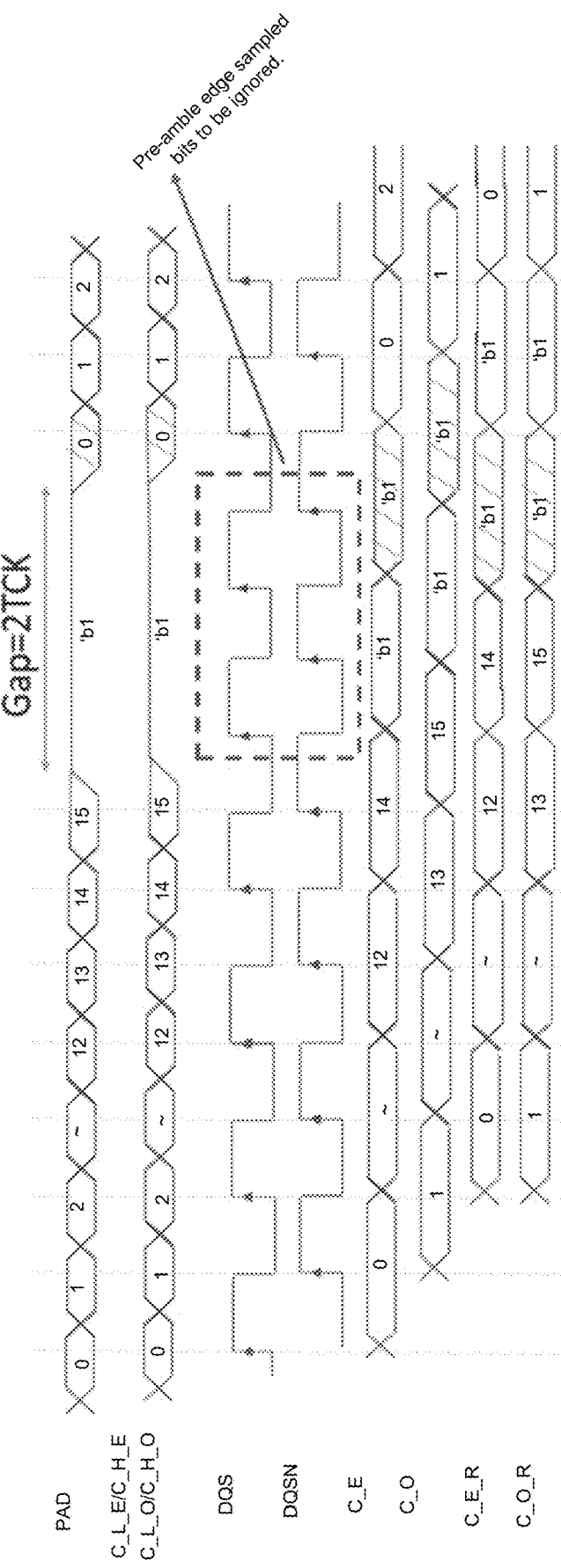
Figure 14:
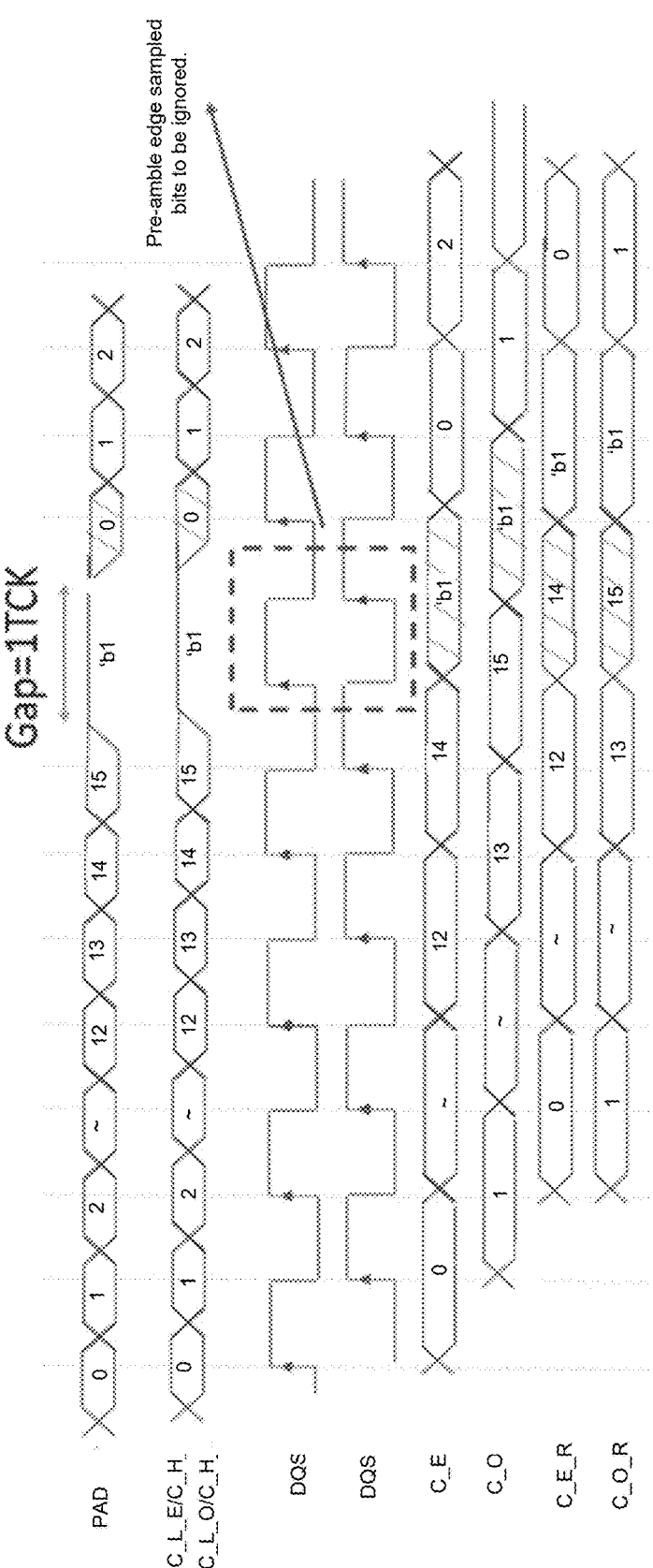
Figure 15:
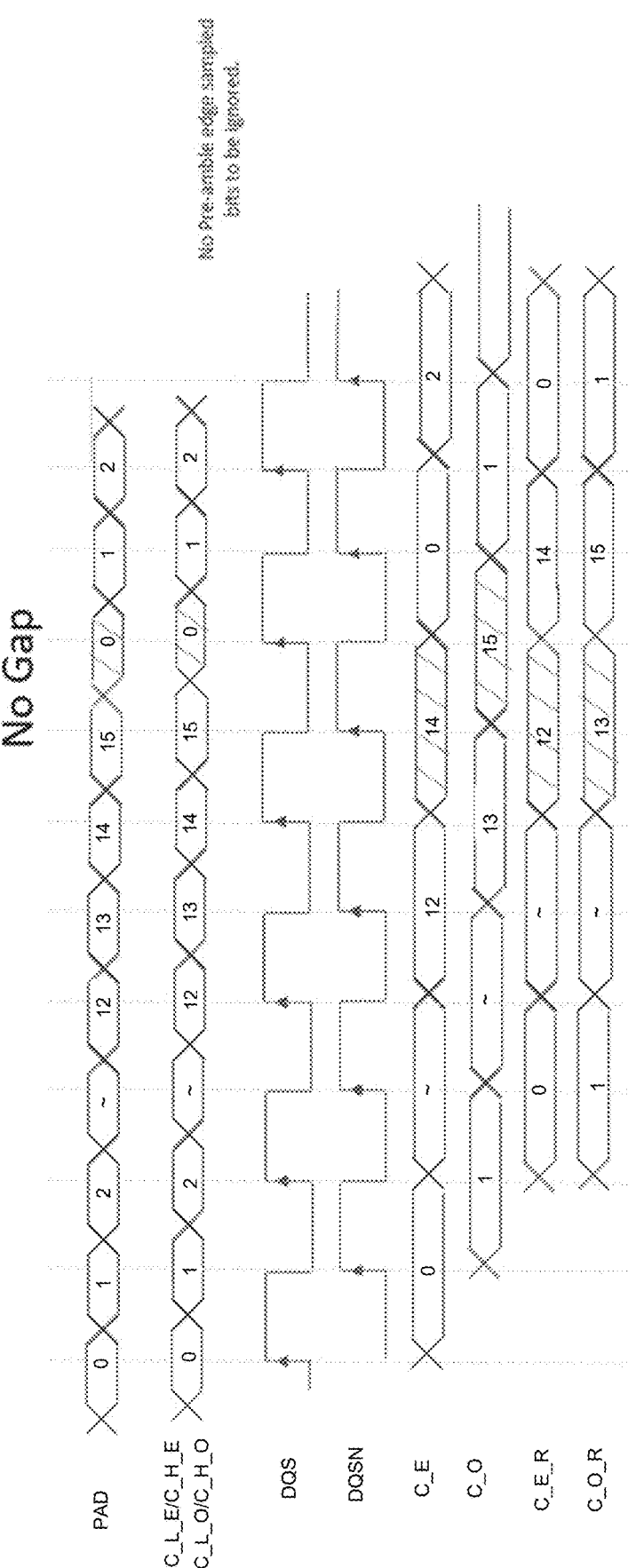
Figure 16:
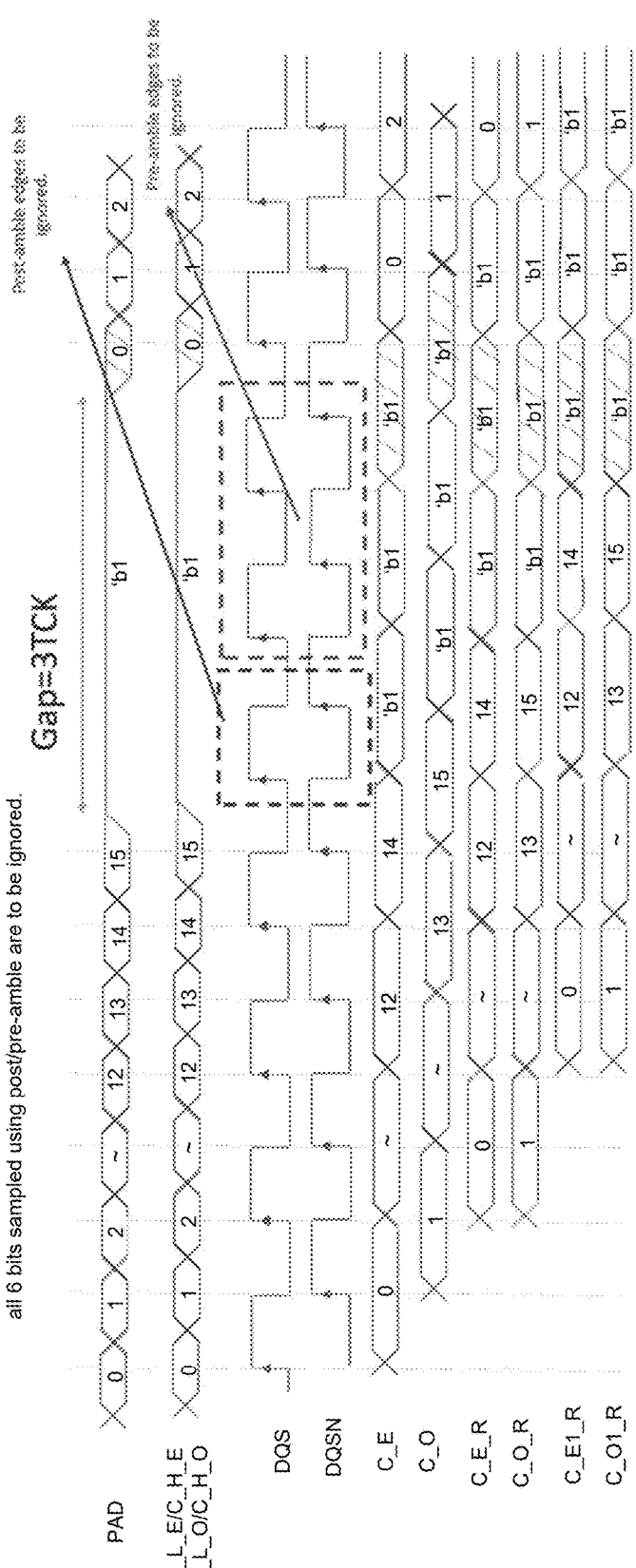

Referring now to FIGS. 10-11, an example CAPDAC circuit 1000 and custom flop structure 1100 that may be used to generate true and complimentary signals complementary are provided respectively. These circuits may be used to improve DFE loop timing as is discussed in further detail hereinbelow.

FIG. 10 shows a capacitive DAC 10002 whose input is V_CTRL<6:0>. TAP2_B<6:0> is the complementary signal of TAP2<6:0>. V_CTRL<6:0> can be either TAP2<6:0> or TAP2_B<6:0>depending on FB_E<0>. FB_EB<0> is the complementary signal of FB_E<0>. Since the only delay from FB_E<0>/FB_EB<0> to V_CTRL<6:0> is a transmission gate delay, this reduces the time delay TCAP for rolled DFE.

FIG. 11 shows a flip flop architecture 1100 that enables fast rolled DFE timing. FB_EB<0> is the complementary signal of FB_E<0>. It is generated by using a tristate inverter that takes the data before the rising edge of clock as its input. Since the inversion is happening before the rising edge of clock this saves one gate delay that would have been spent on inversion. This reduces the time C2Q in rolled DFE.

In some embodiments, for rolled taps, the loop timing consists of clock to Q delay of flop (C2Q), setup time of flop (SETUP), settling time of CAPDAC (TCAP), propagation delay of receiver from input of amplifier to receiver output (RX) and multiplexer delay from input to output (MX_DAT). For the proposed 8.8 Gbps DDR5 receiver: C2Q+SETUP+TCAP+RX+MX_DAT<227 ps (2UI). CAPDAC 1002 implementation of FIG. 10 may utilize a mux to choose between the DFE coefficient with a positive offset (TAP2<6:0>) and a negative offset (TAP2_B<6:0) based on the previous bit (FB_E<0>, FB_EB<0>) as shown in FIG. 10. Typically, multiplexer select input may be inverted inside the multiplexer to generate true and complementary controls for the multiplexer. To reduce the multiplexer select input to data output delay, the complementary multiplexer select signal may be generated along with the true signal within a custom-made flip-flop. In the following structure of flop, Q (e.g., true multiplexer select signal) and QB (complementary multiplexer select signal) may be generated parallelly to reduce one inverter delay. This helps to reduce C2Q delay value and helps to close timing at the highest data rate and slowest PVT corner.

Referring now to FIGS. 12-16, timing diagrams 1200, 1300, 1400, 1500, and 1600 are provided. Timing diagram 1200 shows the use of preamble bits to apply correct DFE offset for initial data bits. During the gap between data bursts, the sampling clock (DQS) may not be available to sample data bits (e.g., logic high for DDR5 system). As such, the previous bits stored in the DFE flops are not correct as shown in timing diagram 1200. In this example, the previous bits stored in DFE flops when gap between bursts is 2TCK.

As shown in timing diagram 1300, during a Read—Idle—Read operation, the 12th, 13th, 14th, and 15th bit from the first burst may be stored as previous bits for the 0th bit of the second burst, which may cause an incorrect offset. Accordingly, embodiments may ensure that previous bits are defined correctly before a valid bit for the DFE circuit to operate correctly. One option may include defining all bits as 'b1 before valid data starts for all bursts but it may cause an incorrect offset for shorter bursts. It also may require extra hardware. Accordingly, preamble edges may be used to define the previous bits before the valid received bit as shown in timing diagram 1400.

In some embodiments, read gate training may ensure that the correct number of preamble edges are sent which are required to define previous bits correctly. As there may be additional edges before the right edge to sample valid data input, unwanted data may be written into the FIFO. Accordingly, read pointers may be updated so that data written using preamble edges are ignored. Embodiments included herein may determine how many bits need to be ignored based upon, at least in part, preamble edges and gap between reads. For example, if a 2TCK toggling preamble option is chosen during a PHY read operation (known as "Pre=4" in JEDEC because of four toggling edges) the following possible options are possible. With Tgap=0, no bits need to be ignored between reads (where Tgap is the gap between reads as shown in timing diagram 1600). With Tgap=1tck, the latest 2 bits sampled by preamble edges need to be ignored between reads as shown in timing diagram 1500. With Tgap>=2tck, then all 4 bits sampled by preamble edges need to be ignored between reads as shown in timing diagram 1400.

Figure 17:
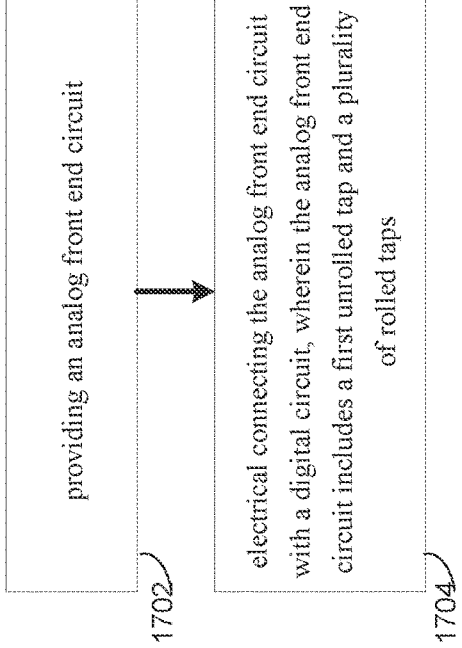
FIG. 17 shows an example flowchart consistent with embodiments of the present disclosure.

In some embodiments, the teachings of the present disclosure may use post-amble and preamble bits to apply correct DFE offset for initial data bits. FIG. 17 shows a timing diagram to show post/pre-amble edge sampled bits to be ignored for DFE to work up to 6Taps when Tgap=3TCK. In this example, a 1.5TCK toggling post-amble along with 2TCK toggling preamble option may be selected and thus may allow the circuit to operate with up to six taps. If the gap between reads is 3TCK, all 6 bits sampled using post/pre-amble are to be ignored.

Referring now to FIG. 17, a flowchart 1700 consistent with embodiments of the present disclosure is provided. Flowchart 1700 includes a floating tap partially rolled digital feedback equalization method. The method may include providing 1702 an analog front end circuit and electrically connecting 1704 the analog front end circuit with a digital circuit, wherein the analog front end circuit includes a first unrolled tap and a plurality of rolled taps.

It will be apparent to those skilled in the art that various modifications and variations can be made in the embodiments of the present disclosure without departing from the spirit or scope of the present disclosure. Thus, it is intended that embodiments of the present disclosure cover the modifications and variations provided they come within the scope of the appended claims and their equivalents.

What is claimed is:

1. A floating tap partially rolled digital feedback equalization circuit comprising:
   an analog front end circuit;
   a digital circuit in electrical communication with the analog front end circuit, wherein the analog front end circuit includes a first unrolled tap and a plurality of rolled taps; and
   an interleaved structure configured to allow data sampling using a rising and a falling edge of a sampling clock, wherein the interleaved structure received data from two separate receivers associated with one or more equalizer taps that are associated with one or more of the first unrolled tap and the plurality of rolled taps.

2. The floating tap partially rolled digital feedback equalization circuit of claim 1, wherein the analog front end circuit includes a plurality of fixed taps.

3. The floating tap partially rolled digital feedback equalization circuit of claim 1, wherein the analog front end circuit includes a plurality of floating taps.

4. The floating tap partially rolled digital feedback equalization circuit of claim 1, wherein the plurality of rolled taps includes 3 rolled taps.

5. The floating tap partially rolled digital feedback equalization circuit of claim 1, wherein data is sampled using the rising edge is EVEN data.

6. The floating tap partially rolled digital feedback equalization circuit of claim 1, wherein data is sampled using the falling edge is ODD data.

7. The floating tap partially rolled digital feedback equalization circuit of claim 1, wherein the analog front end circuit includes four comparators.

8. The floating tap partially rolled digital feedback equalization circuit of claim 1, wherein one or more preamble bits are used to generate a digital feedback equalization offset for one or more initial data bits.

9. The floating tap partially rolled digital feedback equalization circuit of claim 1, wherein one or more postamble bits are used to generate a digital feedback equalization offset for one or more initial data bits.

10. A floating tap partially rolled digital feedback equalization method comprising:
   providing an analog front end circuit;
   electrically connecting the analog front end circuit with a digital circuit, wherein the analog front end circuit includes a plurality of unrolled taps and a plurality of rolled taps; and
   data sampling, via an interleaved structure, using a rising and a falling edge of a sampling clock, wherein the interleaved structure received data from two separate receivers associated with one or more equalizer taps that are associated with one or more of the plurality of unrolled taps and the plurality of rolled taps.

11. The floating tap partially rolled digital feedback equalization method of claim 10, wherein the analog front end circuit includes a plurality of fixed taps.

12. The floating tap partially rolled digital feedback equalization method of claim 10, wherein the analog front end circuit includes a plurality of floating taps.

13. The floating tap partially rolled digital feedback equalization method of claim 10, wherein the plurality of rolled taps includes 3 rolled taps.

14. The floating tap partially rolled digital feedback equalization method of claim 10, wherein data is sampled using the rising edge is EVEN data.

15. The floating tap partially rolled digital feedback equalization method of claim 10, wherein data is sampled using the falling edge is ODD data.

16. The floating tap partially rolled digital feedback equalization method of claim 10, wherein the analog front end circuit includes four comparators.

17. The floating tap partially rolled digital feedback equalization method of claim 10, wherein one or more preamble bits are used to generate a digital feedback equalization offset for one or more initial data bits.

18. The floating tap partially rolled digital feedback equalization method of claim 10, wherein one or more postamble bits are used to generate a digital feedback equalization offset for one or more initial data bits.

* * * * *